United States Patent
Farqué et al.

(10) Patent No.: US 9,172,406 B2
(45) Date of Patent: Oct. 27, 2015

(54) PRESSURE RESISTANT HOUSING DEVICE FOR PROTECTING AN ELECTROMAGNETIC TRANSMITTER

(71) Applicant: Control Devices, Inc., Broken Arrow, OK (US)

(72) Inventors: Jason Farqué, Tulsa, OK (US); Eric Farqué, Tulsa, OK (US)

(73) Assignee: CONTROL DEVICES, INC., Broken Arrow, OK (US)

( * ) Notice: Subject to any disclaimer, the term of this patent is extended or adjusted under 35 U.S.C. 154(b) by 98 days.

(21) Appl. No.: 13/886,505

(22) Filed: May 3, 2013

(65) Prior Publication Data

US 2014/0329478 A1     Nov. 6, 2014

(51) Int. Cl.
*H04B 1/034* (2006.01)
*F16L 55/48* (2006.01)

(52) U.S. Cl.
CPC ............ *H04B 1/034* (2013.01); *F16L 55/48* (2013.01)

(58) Field of Classification Search
CPC ....................... H04B 1/034; F16L 55/48
See application file for complete search history.

(56) References Cited

U.S. PATENT DOCUMENTS

| | | | |
|---|---|---|---|
| 2,820,959 A | 1/1958 | Bell | |
| 4,573,532 A * | 3/1986 | Blake | E21B 33/1243 137/625.19 |
| 5,530,357 A | 6/1996 | Cosman et al. | |
| 5,786,107 A * | 7/1998 | Stafford et al. | 429/163 |
| 6,088,580 A | 7/2000 | Powlousky | |
| 6,470,979 B1 * | 10/2002 | Wentworth | E21B 7/06 175/320 |
| 6,489,771 B1 | 12/2002 | Farque | |
| 7,222,549 B2 | 5/2007 | Abney | |
| 7,821,247 B2 | 10/2010 | Fagbayi et al. | |
| 7,975,392 B1 * | 7/2011 | Spaulding | 33/302 |
| 8,261,623 B2 | 9/2012 | Miller et al. | |
| 8,378,667 B2 | 2/2013 | Miska et al. | |
| 2004/0017569 A1 * | 1/2004 | Payne | 356/436 |
| 2006/0006875 A1 | 1/2006 | Olsson et al. | |
| 2008/0165485 A1 * | 7/2008 | Zadesky et al. | 361/683 |
| 2008/0238427 A1 * | 10/2008 | Clark et al. | 324/347 |
| 2009/0025924 A1 * | 1/2009 | He et al. | 166/66 |
| 2009/0289808 A1 * | 11/2009 | Prammer | E21B 17/003 340/853.7 |
| 2011/0203394 A1 * | 8/2011 | Tinlin | G01D 11/245 73/866.5 |
| 2012/0241218 A1 * | 9/2012 | Chau et al. | 175/45 |

(Continued)

FOREIGN PATENT DOCUMENTS

CN       201845087 U       5/2011
CN       202110294 U       1/2012

(Continued)

OTHER PUBLICATIONS

European Search Report; Jul. 7, 2014; EPO.

(Continued)

*Primary Examiner* — Bobbak Safaipour
*Assistant Examiner* — Devan Sandiford
(74) *Attorney, Agent, or Firm* — Dennis D. Brown; Brown Patent Law, P.L.L.C.

(57) ABSTRACT

A pressure resistant, impact resistant, and corrosion resistant electromagnetic transmitter for pipeline uses and other applications. During use, the ferromagnetic core, the electromagnetic windings, and the other electromagnetic transmission components of the transmitter are entirely contained and sealed within a rugged outer housing.

16 Claims, 1 Drawing Sheet

(56) References Cited

U.S. PATENT DOCUMENTS

2014/0322035 A1* 10/2014 McNichol et al. ............ 417/53
2014/0332235 A1* 11/2014 Mueller ............... E21B 17/028
　　　　　　　　　　　　　　　　　　　166/378

FOREIGN PATENT DOCUMENTS

| | | |
|---|---|---|
| EP | 0122704 | 10/1984 |
| GB | 1397541 | 6/1975 |
| GB | 2297666 | 7/1996 |
| WO | WO 99/25070 | 5/1999 |
| WO | WO 2007/020475 A1 | 2/2007 |
| WO | WO 2011/161468 A2 | 12/2011 |
| WO | WO 2014043580 A2 | 3/2014 |

OTHER PUBLICATIONS

Baker Hughes, "Vertiline", Wireline-conveyed MFL inspection services reduces pipeline maintenance and rehabilitation costs; Baker Atlas; Published: US.

* cited by examiner

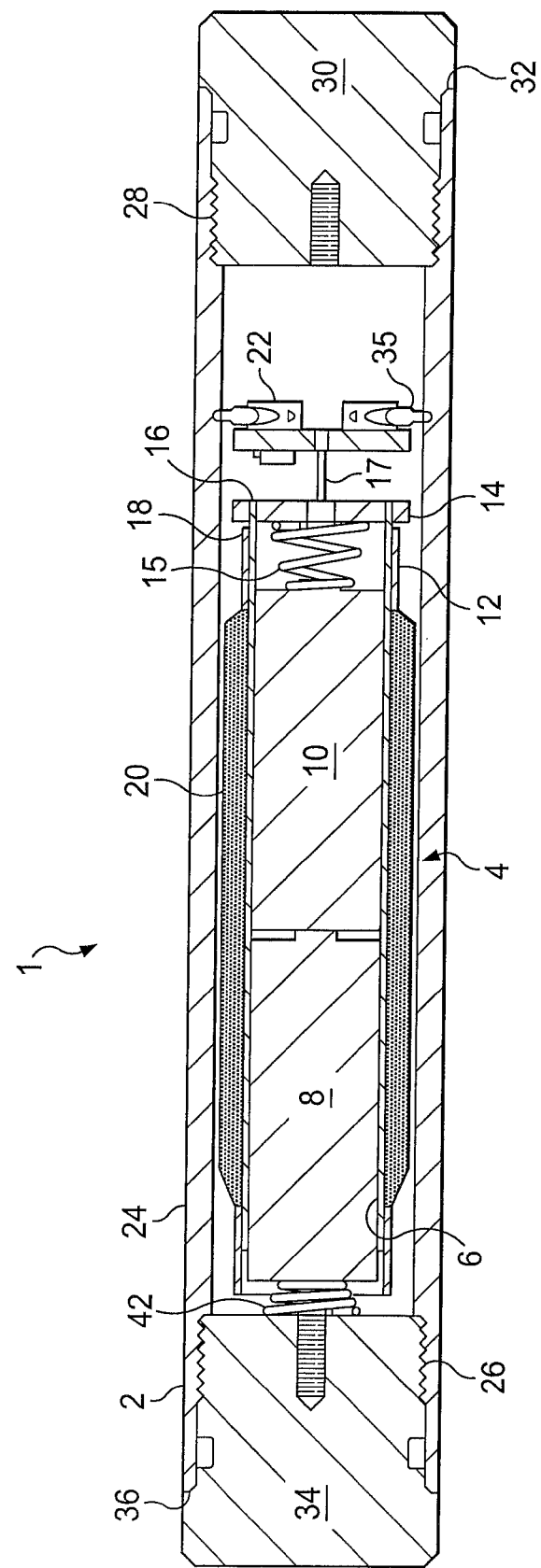

PRESSURE RESISTANT HOUSING DEVICE FOR PROTECTING AN ELECTROMAGNETIC TRANSMITTER

FIELD OF THE INVENTION

The present invention relates to electromagnetic transmitters for use in tracking and locating pipeline pigging devices and for use in other applications.

BACKGROUND OF THE INVENTION

A need exist for an improved electromagnetic transmitting device which can be used, for example, for tracking and locating pigging devices employed in pipeline systems. The improved electromagnetic transmitting device will preferably be (a) compact enough to be installed within or towed behind pigging devices used even in small diameter lines, (b) pressure sealed and pressure resistant, (c) impact resistant, (d) corrosion resistant for use in water lines, petroleum and petroleum product lines, gas lines, etc., (e) resistant to cleaning agents and other chemicals used in such lines, and (f) economical to build and use.

An example of a prior art electromagnetic transmitter is provided in U.S. Pat. No. 6,088,580. The prior art transmitter disclosed in U.S. Pat. No. 6,088,580 comprises a ferromagnetic tubular battery housing. The ferromagnetic battery housing has an electromagnetic coil wrapped around the exterior surface thereof so that the battery housing serves as the transmitter core. The electronic transmission components for the prior art device are also positioned on the exterior surface of the battery housing, adjacent to the electromagnetic coil. In order to provide some degree of protection to the electromagnetic coil and the electronics on the exterior of the battery tube, these components are covered with a non-conductive plastic coating.

Unfortunately, the prior art transmitter disclosed in U.S. Pat. No. 6,088,580 is deficient in various significant respects. In one respect, the only protection provided for the electromagnetic coil and the electronic components of the prior art transmitter against damage caused, for example, by abrupt stops, collisions with valve gates, other impacts, and the high fluid pressure conditions often encountered in pigging operations, is merely a non-conductive plastic coating. The electromagnetic coil and the electronic components are therefore susceptible not only to destructive damage caused by physical collisions and impacts, but also to corrosion and interference caused by exposure to pipeline fluids which can reach the coil and electronic components (a) through breaks, cracks, or chips which occur in the plastic coating and/or (b) by infusion beneath the plastic coating due to high pressure conditions existing in the pipeline.

Moreover, the ferromagnetic core tube of the prior art transmitter is also susceptible to corrosion and chemical attack. Because the core tube must have significant ferromagnetic properties, it cannot be formed, for example, of an austenitic stainless steel such as 304 stainless or 316 stainless which is essentially non-magnetic, or even a ferritic stainless steel which is only somewhat magnetic and is also less rugged.

Rather, it is recommended in U.S. Pat. No. 6,088,580 that the ferromagnetic core tube of the prior art transmitter be formed simply of low carbon steel. Although possessing ferromagnetic properties, low carbon steel is highly susceptible to corrosion when exposed to water and other fluids. Consequently, the core tube of the prior art transmitter is also subject to damage and corrosion caused by exposure to water and/or other fluids or chemicals present in the pipeline which breach the plastic coating through breaks, cracks, or chips, or by pressure infusion. In addition, even if the plastic coating remains intact, the capped end of the ferromagnetic core tube, which must be openable for installing and replacing the batteries, is not coated with the plastic material and therefore is constantly exposed to whatever fluids and chemicals happen to be in the line, no matter how corrosive.

SUMMARY OF THE INVENTION

The present invention provides an electromagnetic transmitter which satisfies the needs and alleviates the problems discussed above. The inventive transmitter can be produced in a very compact form which can, for example, be installed within or towed behind a pipeline pigging device for use in pipelines having diameters ranging from small to large. The inventive transmitter is also a rugged, durable device which is entirely pressure sealed, highly impact resistant, corrosion resistant, and well suited for use in both onshore and offshore applications involving exposure to oil, gas, petroleum products, water, ammonia, carbon dioxide, cleaning agents, and other compositions and chemicals commonly encountered in pipelines.

The inventive transmitter operates by emitting a low frequency electromagnetic field at any desired frequency within a typical range of from about 15 to about 31 Hz. The specific emission frequency of the transmitter can be set or changed as desired by simple radio programming. Alternatively, programming instructions can be downloaded to the transmitter via a USB port or other wired connection. Thus, for example, multiple transmitters can be programmed to operate at different frequencies for tracking and/or locating numerous pigging devices which are being used simultaneously.

In one aspect, there is provided a transmitter comprising: (a) a pressure resistant housing (i.e., a housing which will withstand an external fluid pressure of at least 250 psig); (b) a transmitter assembly positioned within the pressure resistant housing, the transmitter assembly comprising a ferromagnetic tube and an electromagnetic coil wrapped around the ferromagnetic tube; (c) the pressure resistant housing having an access opening for removably inserting one or more batteries for the transmitter assembly; and (d) the pressure resistant housing including a closure for closing and opening the access opening and sealingly enclosing the transmitter assembly and the one or more batteries within the pressure resistant housing.

In another aspect, there is provided a transmitter comprising: (a) an outer tube formed of stainless steel; (b) a transmitter assembly positioned within the outer tube, the transmitter assembly comprising a ferromagnetic tube and an electromagnetic coil wrapped around the ferromagnetic tube; (c) the outer tube having an access opening in a longitudinal end of the outer tube for removably inserting one or more batteries into the outer tube such that the one or more batteries will be received within the ferromagnetic tube; and (d) a stainless steel closure sealably connectable to the outer tube for closing the access opening to sealingly enclose the transmitter assembly and the one or more batteries within the outer tube.

Further aspects, features, and advantages of the present invention will be apparent to those of ordinary skill in the art upon examining the accompanying drawing and upon reading the following Detailed Description of the Preferred Embodiments.

BRIEF DESCRIPTION OF THE DRAWING

The drawing is a cutaway view of an embodiment 1 of the transmitter provided by the present invention.

DETAILED DESCRIPTION OF THE PREFERRED EMBODIMENTS

An embodiment 1 of the transmitter provided by the present invention is illustrated in the drawing. The inventive transmitter 1 comprises an outer pressure resistant housing 2 and a transmitter assembly 4 which is preferably entirely contained within the pressure housing 2.

The internal transmitter assembly 4 comprises: a ferromagnetic tube 12; an electromagnetic coil 20 wrapped around the exterior of the ferromagnetic tube 12 so that the ferromagnetic tube 12 and the windings 20 form an electromagnetic transmission antenna; one or more batteries 8, 10 which are removably received within the ferromagnetic tube 12 for powering the transmitter assembly 4; an insulating tube/sleeve 6 positioned within the ferromagnetic tube 12 between the batteries 8, 10 and the interior surface of the ferromagnetic tube 12 to prevent the batteries from contacting the ferromagnetic tube 12; an end piece 14 which is secured on a projecting distal end 16 of the insulating tube 6 such that the end piece 14 preferably does not contact the corresponding distal end 18 of the ferromagnetic tube 12; a contacting element (preferably, e.g., a conductive spring or other conductive coil member) 15 which extends from the end piece 14 into the insulating tube 6 for making electrical contact with the battery 10; transmission and programming electronics 22 positioned outside of the distal end 16 of the insulating tube 6 adjacent to the end piece 14; and an electrical connection 17 extending through the end piece 14 from the battery contacting element 15 to the transmission and programming electronics 22.

The exterior pressure housing 2 preferably comprises: a pressure resistant tube 24 in which the internal transmitter assembly 4 is positioned and carried, the housing tube 24 preferably being open at one end 36 or at both of its longitudinal ends 32 and 36: internal or external (preferably internal) threads 26 and/or 28 formed in the longitudinal end(s) 32 and/or 36 of the housing tube 24; a pressure resistant closure 34 (e.g., a cap having internal threads or more preferably a plug having external threads) for opening and sealably closing the end 36 (i.e., the battery access opening) of the housing tube 24; a contacting member (preferably, e.g., a conductive spring or other conductive coil member) 42 extending from the end cap or plug 34 of the housing tube 24 for making electrical contact with the battery 8: and a 2-part epoxy or urethane potting compound, or other suitable material, which encapsulates the electronics 22 of the internal transmitter assembly 4 and provides a bond between the internal transmitter assembly 4 and the interior surface of the housing tube 24 such that the transmitter assembly 4 is prevented from sliding back and forth within the housing tube 24 and is retained in electrical contact with the contacting member 42 extending from the housing end cap or plug 34.

In addition, if the other end 32 of the outer housing tube 24 (i.e., the longitudinal end adjacent to the transmission electronics 22) is also openable, the pressure housing 2 preferably further comprises a second pressure resistant closure 30 (e.g., a cap having internal threads or more preferably a plug having external threads) for opening and sealably closing the end 32 of the housing tube 24.

The end cap(s) or plug(s) 30 and/or 34 of the outer housing 2 preferably do not contact either the longitudinal ends of the insulating tube 6 or the longitudinal ends of the ferromagnetic tube 12 of the internal transmitter assembly 4. To close the electrical circuit between the electronics 22 of the internal transmitter assembly 4 and the battery contacting member 42 which extends from the housing end cap or plug 34 received on the battery access opening 36, the electrical current is conducted by the end cap or plug 34 and the wall of the outer housing tube 24 to or from a redundant spring contact or other contact 35 provided within the other longitudinal end 30 of the housing 2.

Because the pressure resistant outer housing 2 of the inventive transmitter 1 need not be formed of a ferromagnetic material, the housing tube 24 and housing end closure(s) 30 and/or 34 can be formed of stainless steel or other rugged materials which are cost effective and provide significant impact resistance, corrosion resistance, and pressure resistance (i.e., collapse strength) for pipeline applications. The type and thickness of the housing material will preferably be selected such that the outer housing 2 will be capable of withstanding pipeline pressures of up to 500 psi, more preferably up to 1000 psi, more preferably up to 1500 psi, more preferably up to 2000 psi, and more preferably up to 2500 psi and higher. The housing tube 24 and end closures 30 and 34 will preferably be formed of an austenitic or ferritic stainless steel, more preferably an austenitic stainless steel, more preferably 304 or 316 stainless steel, and will most preferably be formed of 304 stainless steel.

It will also be understood, however, that the housing tube 24 and other housing components can alternatively be formed of a non-metallic and/or non-conductive material such as, for example, a durable and pressure resistant plastic. If the material is non-conductive, wires and appropriate connectors can be provided within the housing tube 24 and on and/or through the end cap or plug 34 for completing and closing the electrical circuit between the battery contacting member 42 extending from the end cap 34 and the internal electronics 22.

The ferromagnetic tube 12 of the internal transmitter assembly 4 can be formed of generally any ferromagnetic material capable of operating as an electromagnetic transmitter core material. Moreover, because the ferromagnetic tube 12 of the inventive transmitter 1 will not be exposed to pipeline fluids and conditions, the tube 12 can be selected more on the basis of its ferromagnetic properties and to a somewhat lesser degree in regard to its ruggedness.

Examples of ferromagnetic materials suitable for use in forming the ferromagnetic tube 12 include, but are not limited to, low carbon steel, iron based alloys, and silicon electrical steel laminate. The ferromagnetic tube 12 will preferably be a rolled metal tube formed of silicon electric steel laminate.

The outer housing tube 24 and the internal ferromagnetic tube 12 will preferably be cylindrical in shape. However, it will be understood that the housing tube 24 and the ferromagnetic tube 12 can alternatively have cross-sectional configurations which are more square, rectangular, or triangular in shape or can be of generally any other shape desired.

Examples of electromagnetic coil materials suitable for use in forming the windings 20 of the internal transmitter assembly 4 include, but are not limited to, insulated magnet wire of varying gauges. The electromagnetic coil 20 will preferably be formed of insulated copper magnet wire.

The insulating tube 6 of the internal transmitter assembly 4 can be formed of generally any material which is an electrical insulator having sufficient mechanical strength to support the mild pressure of the outer ferromagnetic tube 12 and the electromagnetic coil 20. Examples of materials suitable for use in forming the insulating tube 6 include, but are not limited to, fiberglass, phenolic paper, hardened resins, Nylon, and other machined plastics. The insulating tube 6 will most preferably be formed of fiberglass.

The transmission and programming electronic components 22 of the internal transmitter assembly 4 will preferably comprise one or a series of circuit board pieces having an H-bridge, a microcontroller unit, a radio frequency (RF) antenna, a voltage regulator, a commutator, and a reed switch installed thereon. Similarly, the end piece 14 which is located on the distal end 16 of the insulating tube 6, and which holds the battery contacting coil 15, will also preferably be formed of a piece of circuit board material of the same type used for mounting the transmission and programming electronic components.

As noted above, the transmitting frequency of the inventive transmitter 1 can be set or changed by means of simple radio frequency programming. To facilitate the reception of the radio frequency programming signals by the programming electronics, an openable housing end cap or plug 30, as illustrated in the drawing, will preferably be provided at the longitudinal end 32 of the housing 2 adjacent to the internal transmission and programming electronics 22 so that the end cap or plug 30 can be removed during the programming procedure.

It will further be understood that the inventive transmitter 1 can also include other features and components commonly used in pipeline transmitters for various purposes. For example, if it is necessary that the inventive transmitter 1 must remain dormant in the pipeline for a significant period prior to use, the inventive transmitter 1 can also include an internal clock contained in the on-board controller, a pressure switch, or a rip-cord mechanism for activating the transmitter 1 in situ at a later time when needed in order to preserve battery power.

Thus, the present invention is well adapted to carry out the objects and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims.

What is claimed:

1. A transmitter comprising:
    a pressure resistant housing which is pressure sealed to prevent collapse and leakage against an external fluid pressure of at least 250 psig;
    a transmitter assembly which is entirely positioned and entirely sealed within said pressure resistant housing, said transmitter assembly comprising a ferromagnetic tube and an electromagnetic coil wrapped around said ferromagnetic tube;
    said pressure resistant housing having an access opening for removably inserting one or more batteries for said transmitter assembly such that said one or more batteries will be received within said ferromagnetic tube;
    said pressure resistant housing comprises a sealable outer metal tube wherein said outer metal tube surrounds said ferromagnetic tube and said electromagnetic coil and said access opening is located at a longitudinal end of said outer metal tube;
    said pressure resistant housing including a closure for closing said access opening such that said transmitter assembly and said one or more batteries are sealingly enclosed within said pressure resistant housing and an electrical contact is formed between said closure and said outer metal tube; and
    a battery contacting member extending from said closure a sufficient distance to make electrical contact with one of said one or more batteries within said ferromagnetic tube such that an electrical circuit is formed between said transmitter assembly and said battery contacting member to conduct an electrical current through said battery contacting member, said closure, and said outer metal tube.

2. The transmitter of claim 1 wherein said closure is an end cap or end plug for said outer metal tube.

3. The transmitter of claim 1 wherein said outer metal tube is formed of a substantially non-magnetic metal.

4. The transmitter of claim 3 wherein said outer metal tube is formed of stainless steel.

5. The transmitter of claim 4 wherein said closure is an end cap or end plug formed of stainless steel.

6. The transmitter of claim 3 wherein said outer metal tube is formed of 304 stainless steel.

7. The transmitter of claim 6 wherein said closure is an end cap or end plug formed of 304 stainless steel.

8. The transmitter of claim 1 wherein said ferromagnetic tube is cylindrical.

9. The transmitter of claim 1 wherein said transmitter assembly further comprises a fiberglass tube within said ferromagnetic tube for receiving said one or more batteries such that, when said one or more batteries are received within said ferromagnetic tube, said fiberglass tube prevents said one or more batteries from contacting said ferromagnetic tube.

10. The transmitter of claim 1 wherein, when said one or more batteries are received within said ferromagnetic tube and said access opening is closed by said closure, said closure does not contact said ferromagnetic tube.

11. A transmitter comprising:
    an outer tube formed of stainless steel which is pressure sealed to prevent collapse and leakage against an external fluid pressure of at least 250 psig;
    a transmitter assembly positioned and pressure sealed within said outer tube, said transmitter assembly comprising a ferromagnetic tube and an electromagnetic coil wrapped around said ferromagnetic tube;
    said outer tube having an access opening in a longitudinal end of said outer tube for removably inserting one or more batteries into said outer tube such that said one or more batteries will be received within said ferromagnetic tube;
    a stainless steel closure sealably connectable to said outer tube for closing said access opening to sealingly enclose said transmitter assembly and said one or more batteries within said outer tube and form an electrical contact between said stainless steel closure and said outer tube; and
    a battery contacting member extending from said stainless steel closure a sufficient distance to make electrical contact with one of said one or more batteries within said ferromagnetic tube such that an electrical circuit is formed between said transmitter assembly and said battery contacting member to conduct an electrical current through said battery contacting member, said stainless steel closure, and said outer tube.

12. The transmitter of claim 11 wherein said stainless steel closure is a threaded cap or threaded plug.

13. The transmitter of claim 11 wherein said outer tube and said stainless steel closure are formed of substantially non-magnetic stainless steel.

14. The transmitter of claim 11 wherein said outer tube and said stainless steel closure are formed of 304 stainless steel.

15. The transmitter of claim 11 wherein said transmitter assembly further comprises a fiberglass tube within said ferromagnetic tube for receiving said one or more batteries such that, when said one or more batteries are received within said ferromagnetic tube, said fiberglass tube prevents said one or more batteries from contacting said ferromagnetic tube.

16. The transmitter of claim 11 wherein when said one or more batteries are received within said ferromagnetic tube and said access opening in said longitudinal end of said outer tube is closed by said stainless steel closure, said stainless steel closure does not contact said ferromagnetic tube.

* * * * *